US006737487B2

(12) United States Patent
Meverden

(10) Patent No.: US 6,737,487 B2
(45) Date of Patent: May 18, 2004

(54) POLYOLEFIN BLOCK COPOLYMERS

(75) Inventor: Craig C. Meverden, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/208,302

(22) Filed: Jul. 30, 2002

(65) Prior Publication Data

US 2004/0024148 A1 Feb. 5, 2004

(51) Int. Cl.[7] .......................... C08F 4/622; C08F 4/642; C08F 210/06
(52) U.S. Cl. ................ 526/160; 526/161; 526/172; 526/348; 526/943; 525/240
(58) Field of Search ................ 526/160, 161, 526/172, 348; 525/240

(56) References Cited

U.S. PATENT DOCUMENTS

| 5,700,896 A | 12/1997 | Dolle et al. ............ 526/351 |
| 6,111,046 A | 8/2000 | Resconi et al. ............ 526/348 |
| 6,232,260 B1 * | 5/2001 | Nagy et al. ............ 502/155 |
| 6,451,724 B1 * | 9/2002 | Nifant'ev et al. ............ 502/103 |
| 6,518,378 B2 * | 2/2003 | Waymouth et al. ............ 526/160 |
| 6,541,583 B2 * | 4/2003 | Meverden et al. ............ 526/127 |

FOREIGN PATENT DOCUMENTS

| WO | WO00/01745 | 1/2000 |

OTHER PUBLICATIONS

R. Kravchenko & R. Waymouth, *Macromolecules 31* (1998) 1.
M. Galimberti et al., *Macromolecules 32* (1999) 7968.
*Macromolecules 6* (1973) 925.
G. Odian, *Principles of Polymerization*, $2^{nd}$ edition (1981), pp. 568–580.
*Macromolecules 15* (1982) 1150.

* cited by examiner

*Primary Examiner*—Roberto Rabago
(74) *Attorney, Agent, or Firm*—John Tyrell; Jonathan L. Schuchardt

(57) ABSTRACT

A block copolymer of an α-olefin and a second olefin is disclosed. The block copolymers are not highly isotactic, but contain isotactic sequences and have a narrow molecular weight distribution. A process for the preparation of these block copolymers and blends of these copolymers are also disclosed.

14 Claims, No Drawings

POLYOLEFIN BLOCK COPOLYMERS

FIELD OF THE INVENTION

This invention relates to block copolymers of an α-olefin and a second olefin. The block copolymers are not highly isotactic, but contain isotactic sequences and have a narrow molecular weight distribution. Blends of these block copolymers are disclosed.

BACKGROUND OF THE INVENTION

Copolymers of an α-olefin and a second olefin are known and are characterized as being random or block, by their molecular weight distribution, and by the stereoregularity of the monomer units. By "stereoregularity," we mean whether the α-olefin recurring units are present in the isotactic, syndiotactic or atactic configuration. These features affect copolymer processability and physical properties. Dependent upon the end use application, different properties are desirable.

Comonomer content and comonomer distribution within the polymer chain also affect copolymer properties. R. Kravchenko and R. Waymouth, *Macromolecules* 31 (1998) 1, studied arylindene zirconocenes as catalysts for ethylene-propylene copolymerizations. They report random or slightly blocky incorporation of the comonomers (monomer reactivity ratio product, $r_1r_2=1.0–1.9$) with the unbridged catalysts and alternating distribution with the bridged catalyst studied. They show a table of eighteen other catalysts previously studied in the literature. None of the thirteen metallocene catalysts gave block copolymers ($r_1r_2$ varied from as low as 0.14 to as high as 1.5). Of the Ziegler-Nafta catalysts, heterogeneous titanium catalysts gave block copolymers, but these have a broad molecular weight distribution. None of the polymers had both $r_1r_2>2.0$ and narrow molecular weight distribution.

M. Galimberti et al, *Macromolecules* 32 (1999) 7968, reported some ethylene-propylene block copolymers but these were completely isotactic (isotacticity index=1.0). U.S. Pat. No. 6,111,046 provides copolymers of ethylene and propylene such that the propylene sequences have an atactic structure and the copolymer is substantially amorphous. U.S. Pat. No. 5,700,896 provides a copolymer with long isotactic sequences but as a random copolymer.

U.S. Pat. No. 6,232,260 discloses the use of transition metal catalysts based upon indenoindolyl ligands. Although it is mentioned that combinations of olefins can be used, all of the examples are ethylene polymerizations or copolymerizations of ethylene with 1-butene. There is no indication that block copolymers could be formed nor is there any indication of stereochemical control.

Pending Application Ser. No. 09/859,332, filed May 17, 2001, now U.S. Pat. No. 6,541,583, discloses a process for the polymerization of propylene in the presence of a Group 3–5 transition metal catalyst that has two non-bridged indenoindolyl ligands wherein the resulting polypropylene has isotactic and atactic stereoblock sequences. No copolymers were prepared and there is no indication given that the process would be suitable for copolymerization.

Generally, copolymers that are highly isotactic (isotacticity index >0.90) are substantially crystalline. While crystallinity increases stiffness, it often decreases the elastic properties of the polymer. Conversely, copolymers that have low tacticity (isotacticity index <0.40) are usually soft and flexible but will have lower strength and may have a tacky feel. Copolymers having intermediate tacticity would retain some of the stiffness and strength of highly isotactic copolymers, but would have enhanced flexibility and a low degree of tackiness.

"Blocky" copolymers, i.e., ones that have $r_1r_2$ values greater than 2.0, have the potential to be highly compatible with a wide range of other polymers, e.g., polyethylenes, polypropylenes, elastomeric polyolefins, and the like. Moreover, blocky copolymers can also have enhanced thermal properties.

Copolymers with narrow molecular weight distribution ($M_w/M_n$) are desirable because they often have improved strength and mechanical properties compared with polymers having broader $M_w/M_n$ values.

Despite the considerable work done in this area, only copolymers with a maximum of two of the desired features have been available. A copolymer is needed with all three features, namely a blocky copolymer, having a narrow molecular weight distribution and stereoregularity that is not highly isotactic but contains relatively long isotactic sequences. Copolymers with all three features should have excellent elastomeric and thermoplastic-elastomeric properties (high tensile strength, high elongation, good elastic recovery) and excellent compatibility with many olefin polymers.

SUMMARY OF THE INVENTION

The invention is a block copolymer of an α-olefin and a second olefin. The block copolymer has an isotacticity index of 0.40 to 0.90 and a molecular weight distribution ($M_w/M_n$) less than 6.0. In addition, the copolymer has substantial blockiness; the product of the reactivity ratios of the olefin monomers ($r_1r_2$) is greater than 2.0. Copolymers of the invention have excellent elastomeric and thermoplastic-elastomeric properties and are compatible with many olefin polymers.

Also provided are a copolymerization process and blends of the polyolefin block copolymer with a second polymer. The copolymerization process is done in the presence of an activator and a Group 3–5 transition metal catalyst that has two non-bridged indenoindolyl ligands.

DETAILED DESCRIPTION OF THE INVENTION

Suitable α-olefins for the copolymerization are $C_3$–$C_{20}$ α-olefins such as propylene, 1-butene, 1-hexene and 1-octene. Preferred α-olefins are propylene, 1-butene, 1-hexene and 1-octene. Particularly preferred is propylene. The second olefin is different from the first. Suitable second olefins are $C_2$–$C_{20}$ α-olefins, such as ethylene, propylene, 1-butene, 1-hexene, 1-octene. Preferred second olefins are ethylene, propylene, 1-butene, 1-hexene and 1-octene. Particularly preferred is ethylene. A preferred combination of an α-olefin and a second olefin is propylene and ethylene. A third olefin may be used. Suitable third olefins are $C_2$–$C_{20}$ α-olefins, such as ethylene, propylene, 1-butene, 1-hexene, 1-octene and non-conjugated dienes such as 1,5-hexadiene and 2,5-norbornylene. Preferably, the block copolymer comprises more than 60 mole % propylene units and more preferably more than 80 mole % propylene units.

The tacticity of a polymer or copolymer affects its properties. The term "tacticity" refers to the stereochemical configuration of the polymer. For example, adjacent monomer units can have either like or opposite configuration. If all monomer units have like configuration, the polymer is "isotactic." If adjacent monomer units have opposite configuration and this alternating configuration continues along the entire polymer chain, the polymer is "syndiotactic." If the configuration of monomer units is random, the polymer is "atactic." When two contiguous monomer units, a "diad," have the same configuration, the diad is called isotactic or "meso" (m). When the monomer units have opposite configuration, the diad is called "racemic" (r). For three adjacent monomer units, a "triad," there are three possibilities. If the three adjacent monomer units have the same configuration, the triad is designated mm. An rr triad has the middle monomer unit having an opposite configuration from either neighbor. If two adjacent monomer units have the same configuration and it is different from the third monomer, the triad is designated as having mr tacticity. The configuration can be determined by $^{13}C$ nuclear magnetic resonance spectroscopy as described in *Macromolecules* 6 (1973) 925 and references cited therein, and in PCT Int. Appl. WO 00/01745. For more information on polymer stereochemistry, see G. Odian, *Principles of Polymerization*, $2^{nd}$ edition (1981), pages 568–580.

The configuration of the monomer units affects polymer properties. For example, highly isotactic polypropylene readily forms a crystalline structure and has excellent chemical and heat resistance. Unlike isotactic polypropylene, atactic polypropylene is amorphous. It has less chemical and heat resistance than isotactic polypropylene. It is mainly used in adhesives.

To quantify the tacticity of a polymer, we calculate an isotacticity index from the configuration of the triads. By "isotacticity index" we mean the quantity of triads having the same configuration divided by the total of all the triads. Therefore, the isotacticity index=mm/[mm+mr+rr]. A completely isotactic copolymer would have an isotacticity index of 1.0. When the isotacticity index is greater than 0.90, the copolymer is highly isotactic. A completely atactic copolymer would have an isotacticity index of 0.25. Copolymers of the invention are not highly isotactic, but contain relatively long isotactic sequences. Blocks of atactic stereosequences may also be present. The copolymers are characterized by having an isotacticity index of 0.40 to 0.90, preferably 0.45 to 0.80.

The copolymer has a narrow molecular weight distribution. The molecular weight distribution can be measured by gel permeation chromatography and is the ratio of the weight average ($M_w$) and number average ($M_n$) molecular weights. By a narrow molecular weight distribution, we mean $M_w/M_n$ is less than 6.0, preferably less than 4.0. The molecular weight distribution affects polymer properties such as toughness and processability.

The reactivity of the two olefins affects their distribution within the polymer chain. The monomer reactivity ratio product can be determined by $^{13}C$ nuclear magnetic resonance spectroscopy as described in *Macromolecules* 15 (1982) 1150. For example, with an ethylene-propylene copolymer, the analysis shows diads corresponding to PP, EE and PE sequences. The monomer reactivity ratio product can be calculated from the diads; $r_1r_2=EE(PP/(PE/2)^2)$. When the comonomer sequence distribution is random, $r_1r_2$ is about 1.0. An alternating comonomer distribution $r_1r_2$ less than 1.0 and a copolymer with blocks of each comonomer has $r_1r_2$ greater than 1.0. The greater $r_1r_2$, the longer the block sequences. The copolymer of the invention is a block copolymer and $r_1r_2$ is greater than 2.0, preferably greater than 2.5.

The block copolymers can be prepared by copolymerizing an α-olefin with a second olefin in the presence of an activator and a Group 3–5 transition metal catalyst. The preferred catalyst has two indenoindolyl ligands which derive from an indenoindole compound. By "indenoindole compound," we mean an organic compound that has both indole and indene rings. The five-membered rings from each are fused, i.e., they share two carbon atoms. The indenoindolyl ligands are not bridged to each other.

The catalyst preferably has the general structure

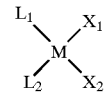

where M is a Group 3–5 transition metal. Preferably, M is zirconium. The indenoindolyl ligands, $L_1$ and $L_2$, are π-bonded to M. $L_1$ and $L_2$ can be the same or different and preferably have the following alternative structures:

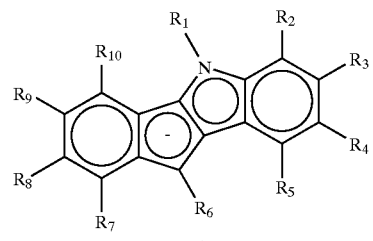

and

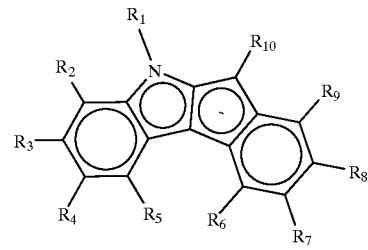

$R_1$ is preferably selected from the group consisting of alkyl, aryl, aralkyl, and silyl groups. Examples are methyl, t-butyl, phenyl, and trimethylsilyl groups. $R_2$ through $R_{10}$ are the same or different and are preferably selected from the group consisting of hydrogen, alkyl, aryl, aralkyl, silyl, halogen, alkoxy, aryloxy, siloxy, thioether, nitro, amino groups, and the like.

The catalyst has two other ligands, $X_1$ and $X_2$, which can be the same or different. They are preferably selected from the group consisting of halogen, alkoxy, aryloxy, siloxy, dialkylamino, diarylamino, and hydrocarbyl groups. Labile ligands such as halogen are particularly preferred.

Examples of suitable catalysts include bis-(2-chloro-5-phenyl-5,10-dihydroindeno[1,2-b]indolyl)zirconium dichloride (Structure I), bis-(5-phenyl-5,10-dihydroindeno[1,2-b] indolyl)zirconium dichloride (Structure II), bis-(5,8-dimethyl-5,10-dihydroindeno[1,2-b]indolyl)zirconium dichloride (Structure III), and bis-(5-trimethylsilyl-8-methyl-5,10-dihydroindeno[1,2-b]indolyl)zirconium dichloride (Structure IV). A more preferred catalyst is bis-(2-chloro-5-phenyl-5,10-dihydroindeno[1,2-b]indolyl) zirconium dichloride (Structure I).

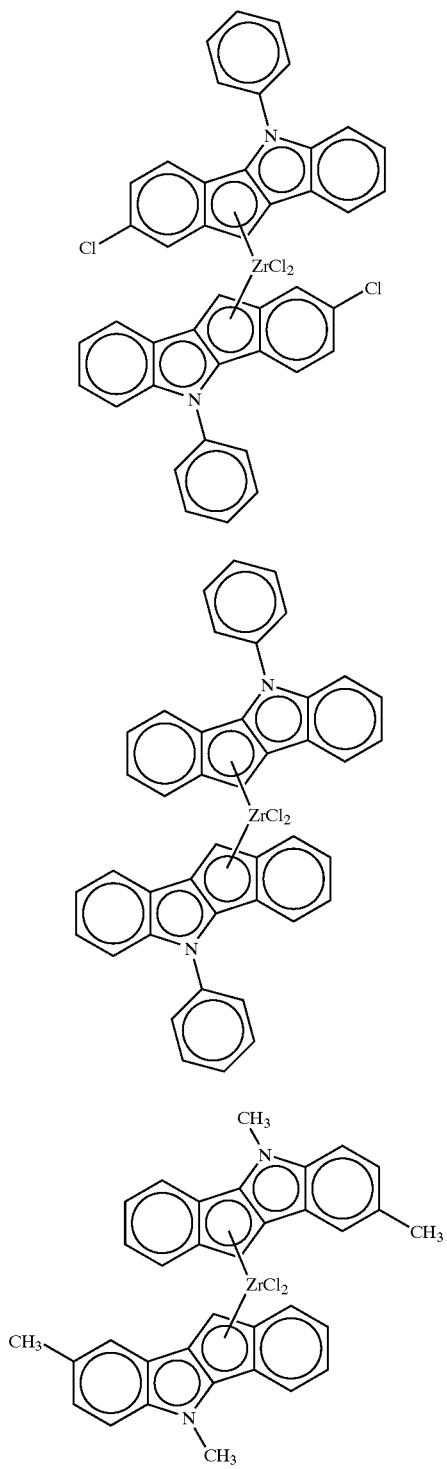
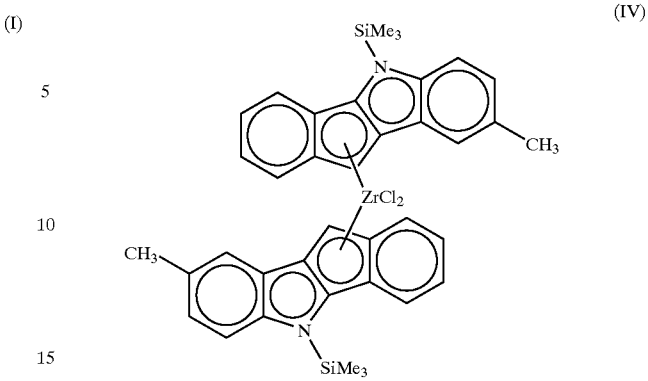
The catalysts can be prepared by any known method. U.S. Pat. No. 6,232,260, the teachings of which are incorporated herein by reference, teaches in great detail how to prepare indenoindole-based catalysts. For instance, Catalyst III can be made according to the following scheme:
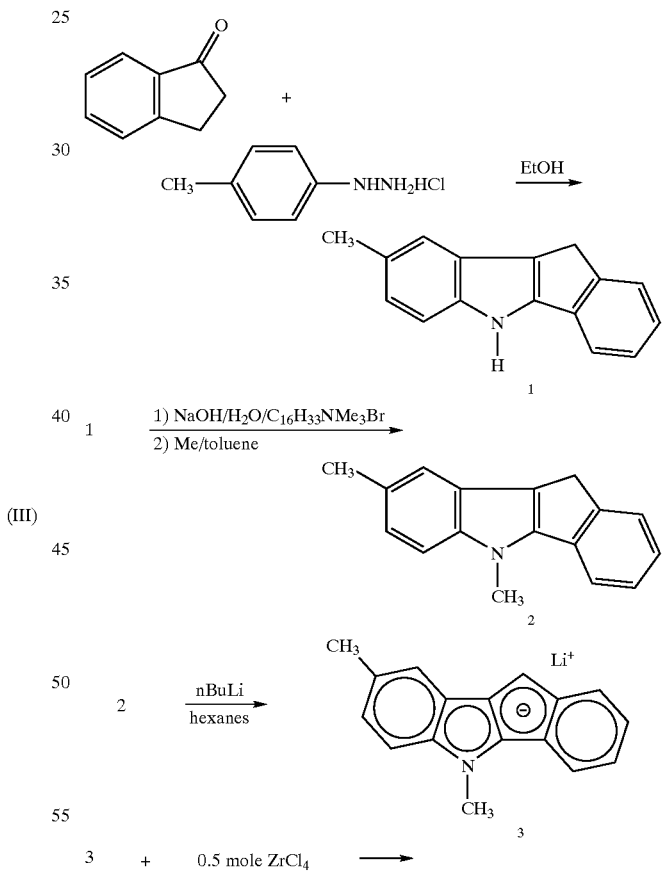

-continued

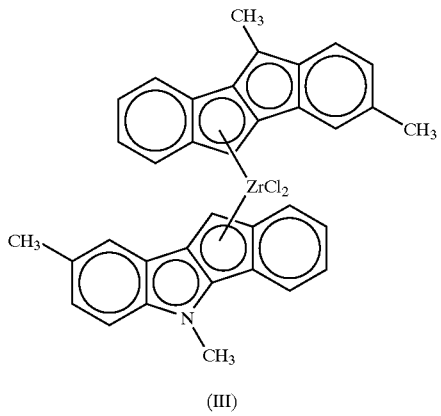

(III)

The catalysts are activated. Suitable activators include alumoxanes, alkyl aluminums, alkyl aluminum halides, anionic compounds of boron or aluminum, trialkylboron and triarylboron compounds. Examples include methyl alumoxane (MAO), polymeric MAO (PMAO), ethyl alumoxane, diisobutyl alumoxane, triethylaluminum, diethyl aluminum chloride, trimethylaluminum, triisobutyl aluminum, lithium tetrakis(pentafluorophenyl)borate, lithium tetrakis (pentafluorophenyl)aluminate, dimethylanilinium tetrakis (pentafluorophenyl)borate, trityl tetrakis(pentafluorophenyl) borate, tris(pentafluorophenyl)borane, triphenylborane, tri-n-octylborane, the like, and mixtures thereof.

Selection of activator depends on many factors including the catalyst used and the desired copolymer properties. For instance, in the copolymerization of propylene with ethylene, when bis(2-chloro-5-phenyl-5,10-dihydroindeno [1,2-b]indolyl)zirconium dichloride is used as a catalyst and MAO as an activator, the copolymer produced has higher isotacticity index and longer block sequences than a copolymer prepared while using a combination of triisobutylaluminum and trityl tetrakis(pentafluoro-phenyl)borate as activator.

Optionally, the catalyst is immobilized on a support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene.

Many types of polymerization processes can be used. The process can be practiced in the gas phase, bulk, solution, or slurry. The polymerization can be performed over a wide temperature range. Preferably, the temperature is within the range of about 0° C. to about 150° C. A more preferred range is from about 25° C. to about 100° C.

The unique structure of these copolymers makes them excellent blend components. The relatively long isotactic sequences should enhance compatibility with other polymers and copolymers and give blends with enhanced properties such as improved impact strength, stiffness and clarity. The copolymers can be blended with any of several addition or condensation polymers or copolymers such as polypropylene, polystyrene, polyvinyl alcohol, polyvinyl chloride, EPDM, polyamides or polycarbonate. Preferably, the blend is with polyolefins such polypropylene, polyethylene or LLDPE. Of these, a preferred blend is with polypropylene and a particularly preferred blend is with isotactic polypropylene.

The following examples merely illustrate the invention. Those skilled in the art will recognize many variations that are within the spirit of the invention and scope of the claims.

EXAMPLE A

Preparation of Catalyst I: Bis(2-chloro-5-phenyl-5, 10-dihydroindeno[1,2-b]indolyl)zirconium Dichloride In a 100 mL round bottom flask, 50 mL ethanol, 4 mL $H_2SO_4$, 5.09 grams 5-chloro-1-indanone (0.0306 moles) and 6.74 grams N,N-diphenylhydrazine hydrochloride (0.0306 moles) were mixed and heated to reflux for 4 hours. A brown solid was isolated upon cooling from the reaction mixture and recrystallized from ethanol to yield 7.55 grams of the indenoindole product (72% yield).

Under a dry nitrogen atmosphere, 2.37 grams (0.0075 moles) of 2-chloro-5-phenyl-5,10-dihydroindeno[1,2-b] indole was slurried in 40 mL of hexane. To the slurry was added 5.6 mL of a 2.0 M solution of n-butyllithium in cyclohexane. The mixture was stirred at room temperature under a nitrogen atmosphere for 67 hours. The resulting yellow solid was filtered, washed with hexane and dried under vacuum (1.8 grams, 67% yield).

The above lithium salt (0.9 gram, 0.0028 moles) was dissolved in a mixture of 4 mL of toluene and 0.5 mL of diethylether. Zirconium tetrachloride (0.34 gram, 0.0014 moles) was slurried in a mixture of 10 mL diethylether and 4 mL toluene. The lithium salt solution was slowly added into the slurry under a dry nitrogen atmosphere at 25° C. The mixture was then stirred at 25° C. for 40 hours. The resulting orange solid was filtered, washed with diethylether and dried under vacuum (0.72 gram, 58% yield).

EXAMPLE B

A solution of catalyst and activator was prepared in an inert atmosphere dry box by mixing 5 mg of Catalyst 1 from Example A with 1.9 mL of a 10% by weight solution of MAO in toluene and 3.0 mL of toluene. The solution was allowed to stand for 30 minutes before adding to the polymerization reactor.

EXAMPLE C

A solution of catalyst and activator was prepared in an inert atmosphere dry box by mixing 5 mg of Catalyst 1 from Example A with 12 mg trityl tetrakis(pentafluorophenyl) borate, 1.5 mL triisobutylaluminum (25% by weight in heptane) and 3.5 mL of toluene. The solution was allowed to stand for 30 minutes before adding to the polymerization reactor.

EXAMPLES 1–9

Copolymer Preparation

Copolymerizations were performed in a 1L stainless-steel stirred reactor. To the reactor, at room temperature, was charged 400 mL of dry, oxygen-free propylene. Then 0.8 mL of a 25% by weight solution of triisobutylaluminum in heptane (400 mL) was added and flushed into the reactor with 50 mL of isobutane. Ethylene gas was added to increase reactor pressure by 20, 40, or 60 psig as indicated in Table 1 to give the desired propylene/ethylene ratio. The polymerization was begun by adding 1.0 mL of catalyst solution from Example B or C as indicated in Table 1 followed with a flush of 50 mL of isobutane. Ethylene was fed on demand to maintain reactor pressure and the temperature was maintained at 25° C. After 15 minutes of polymerization, the reactor was vented to remove the remaining monomers and isobutane. The polymer was removed from the reactor, soaked overnight in 1 L of methanol, filtered, and dried. Table 1 gives the copolymerization conditions and the polymer properties.

Each of these fractions had high $r_1r_2$ indicating blockiness of comonomer incorporation across the whole polymer composition.

TABLE 1

Polymerization Results

| Example | Ethylene (psig) | Catalyst solution | Productivity kg/mol Zr-hr | $M_w$ | $M_w/M_n$ | Incorporated $C_2H_4$ (mol %) | $r_1r_2$ | Isotacticity Index |
|---|---|---|---|---|---|---|---|---|
| C1 | 0 | Ex B | 24,000 | 177,000 | 4.1 | 0 | — | — |
| 2 | 20 | Ex B | 39,000 | 347,000 | 3.3 | 15.9 | 3.0 | 0.65 |
| 3 | 20 | Ex B | 49,000 | 342,000 | 3.6 | 11.0 | 3.1 | 0.69 |
| 4 | 40 | Ex B | 65,000 | 378,000 | 3.9 | 25.0 | 2.8 | 0.69 |
| 5 | 60 | Ex B | 71,000 | 502,000 | 3.3 | 33.9 | 3.1 | 0.71 |
| C6 | 0 | Ex C | 10,000 | 212,000 | 3.7 | 0 | — | — |
| 7 | 20 | Ex C | 47,000 | 226,000 | 3.6 | 17.1 | 2.7 | 0.46 |
| 8 | 40 | Ex C | 64,000 | 249,000 | 3.8 | 29.0 | 2.4 | 0.48 |
| 9 | 60 | Ex C | 96,000 | 311,000 | 3.6 | 43.4 | 2.2 | 0.47 |

Isotacticity index was calculated from $^{13}C$ NMR data using a technique similar to the one described in PCT Int Appl. WO 00/01745.

Comparative Example 1 and Comparative Example 6 are homopolymers of propylene. Examples 2 and 3 are duplicate polymerizations and show that the invention is reproducible. Examples 2–5 and 7–9 illustrate the formation of copolymers with all three desired properties, namely a block copolymer with $r_1r_2$ greater than 2.0, a narrow molecular weight distribution and stereoregularity that is not highly isotactic but contains relatively long isotactic sequences. Examples 2–5 and 7–9 also show enhanced productivity and higher molecular weight compared with homopolymer preparation.

EXAMPLES 10 AND 11

A single copolymer with $r_1r_2$ greater than 2.0 has relatively long blocks. It is possible for a copolymer composition which is a blend of random copolymers, each with $r_1r_2$ about 1.0, to have an $r_1r_2$ value greater than 2.0. Conventional Ziegler-Natta polymers are thought to have generally high $r_1r_2$ values because they are essentially blends of random polymers. To verify that the copolymers of the invention are not simply blends of random copolymers, fractionation studies were done. If these polymers are simply blends of random copolymers, we would expect $r_1r_2$ for the fractions to be about 1.0. On the other hand, if they are copolymers with substantial blockiness, the fractions should have $r_1r_2$ greater than 2.0.

EXAMPLE 10

The copolymer of Example 3 was compression molded into films approximately 75–100 microns in thickness and cut into approximately 12 mm square pieces. Five grams of these pieces were then stirred in a flask containing 400 mL of hexane at room temperature for 50 minutes. The insoluble material was collected on a mesh screen and dried. The hexane soluble copolymer was reprecipitated in methanol and dried. The total recovery was 96%. The hexane insoluble fraction represented 53% of the original polymer weight and had the following properties: $M_w$=404,000; $M_w/M_n$=3.8; incorporated ethylene=10.3 mol %; $r_1r_2$=3.6. The hexane soluble fraction represented 43% of the original polymer weight and had the following properties: $M_w$=257,000; $M_w/M_n$=3.9; incorporated ethylene=12.4 mol %; $r_1r_2$=3.1.

This procedure separated the copolymers into fractions having different molecular weights and comonomer levels. Each of these fractions had $r_1r_2$ greater than 2.0, indicating blockiness of comonomer incorporation across the whole polymer composition.

EXAMPLE 11

The copolymer of Example 4 was compression molded into films approximately 75–100 microns in thickness and cut into approximately 12 mm square pieces. Five grams of these pieces were then stirred in a flask containing 400 mL of hexane at room temperature for 90 minutes. The insoluble material was collected on a mesh screen and dried. The hexane soluble copolymer was reprecipitated in methanol and dried. The total recovery was 90%. The hexane insoluble fraction represented 22% of the original polymer weight and had the following properties: $M_w$=459,000; $M_w/M_n$=3.5; incorporated ethylene=12.5 mol %; $r_1r_2$=4.0. The hexane soluble fraction represented 68% of the original polymer weight and had the following properties: $M_w$=287,000; $M_w/M_n$=4.0; incorporated ethylene=22.0 mol %; $r_1r_2$=3.0.

This procedure separated the copolymers into fractions having different molecular weights and comonomer levels. Each of these fractions had $r_1r_2$ greater than 2.0, indicating blockiness of comonomer incorporation across the whole polymer composition.

Thus, Examples 10 and 11 demonstrate that the copolymers are not simply blends of random copolymers of different molecular weights and comonomer contents.

I claim:

1. A block copolymer comprising recurring units of an α-olefin, a second olefin, and a third olefin, the block copolymer displaying the following properties:
   (a) isotacticity index of 0.40 to 0.90;
   (b) molecular weight distribution less than 6.0; and
   (c) $r_1r_2$ greater than 2.0; wherein $r_1r_2$ is the product of the reactivity ratios for the α-olefin and the second olefin.

2. A block copolymer comprising recurring units of greater than 60 mole % propylene and a second olefin, the block copolymer displaying the following properties;
   (a) isotacticity index of 0.40 to 0.90;
   (b) molecular weight distribution less than 6.0; and
   (c) $r_1r_2$ greater than 2.0; wherein $r_1r_2$ is the product of the reactivity ratios for propylene and the second olefin.

3. The copolymer of claim 2 comprising greater than 80 mole % propylene recurring units.

4. A blend comprising the copolymer of claim 2 and a second polymer.

5. The blend of claim 4 wherein the second polymer is polypropylene.

6. The copolymer of claim 2 displaying the following properties:
(a) isotacticity index of 0.45 to 0.80;
(b) molecular weight distribution less than 4.0; and
(c) $r_1r_2$ greater than 2.5.

7. A process which comprises copolymenzing an α-olefin with a second olefin in the presence of an activator and a Group 3–5 transition metal catalyst that has two non-bridged indenoindolyl ligands; wherein the resulting block copolymer has isotactic and atactic stereoblock sequences.

8. The process of claim 7 wherein the catalyst has the general structure.

wherein M is a Group 3–5 transition metal; $X_1$ and $X_2$ are the same or different and are selected from the group consisting of halogen, alkoxy, aryloxy, siloxy, dialkylamino and hydrocarbyl ligands; $L_1$ and $L_2$ are the same or different and are selected from the group consisting of

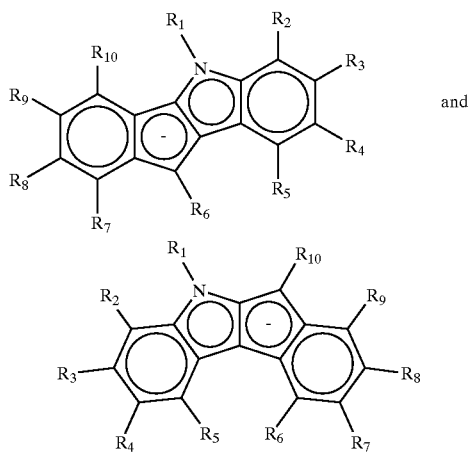

and wherein $R_1$ is selected from the group consisting of alkyl, aryl, aralkyl, and silyl groups: $R_2$ through $R_{10}$ are the same or different and selected from the group consisting of hydrogen, alkyl, aryl, aralkyl, silyl, halogen, alkoxy, aryloxy, siloxy, thioether, nitro, dialkyl amino, and diaryl amino groups.

9. The process of claim 7 wherein the polymerization is performed at a temperature within the range of about 0° C. to 150° C.

10. The process of claim 7 wherein the copolymer has the following properties:
(a) isotacticity index of 0.40 to 0.90;
(b) molecular weight distribution less than 6.0; and
(c) $r_1r_2$ greater than 2.0; wherein $r_1r_2$ is the product of the reactivity ratios for the α-olefin and the second olefin.

11. A process which comprises copolymerizing an α-olefin with a second olefin in the presence of a catalyst that has the general structure

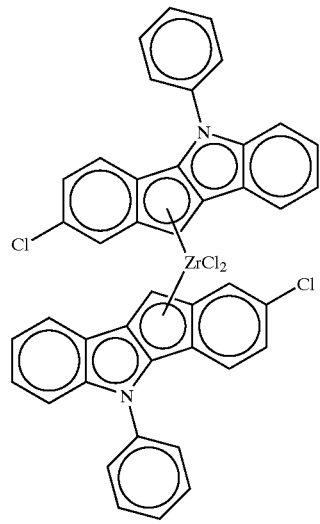

and an alumoxane activator; wherein the resulting copolymer has isotactic and atactic stereoblock sequences.

12. A copolymer prepared by the process of claim 7.

13. A blend comprising the copolymer of claim 12 and a second polymer.

14. The blend of claim 13 wherein the second polymer is polypropylene.

* * * * *